May 11, 1926.

A. B. SEVERN 1,584,040

METHOD OF FORMING SIDE BEARINGS

Filed June 10, 1924

WITNESSES
J. Herbert Bradley.
C. R. Halbert

INVENTOR
Arthur B. Severn
By Hunter, Brown & Critchlow
his Attys.

Patented May 11, 1926.

1,584,040

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

METHOD OF FORMING SIDE BEARINGS.

Application filed June 10, 1924. Serial No. 719,072.

This invention relates to roller side bearings, and particularly to a method of forming roller side bearings for railway cars, or other similar purposes.

Heretofore, it has been common practice to construct cages for roller side bearings by casting, or by more or less complicated forging operations, frequently necessitating the employment of several parts, and resulting in a composite structure. Many of these methods referred to are not only expensive and possess inherent disadvantages, but the resulting product possesses objectionable features from a constructional viewpoint.

It is an object of this invention to provide a method not only overcoming the objections noted, but which will at the same time produce a highly desirable product which is extremely simple in construction and effective in operation.

It is a special object of the invention to provide a method eliminating casting in the formation of the cage, in which the entire bearing cage may be principally fabricated by a single rolling operation, and completed by a few simple subsequent forging operations, and in which the final result will be an integral structure of light weight and of great strength.

These and other objects of the invention will more fully appear when taken in conjunction with the following description and the appended claims.

Figure 1:
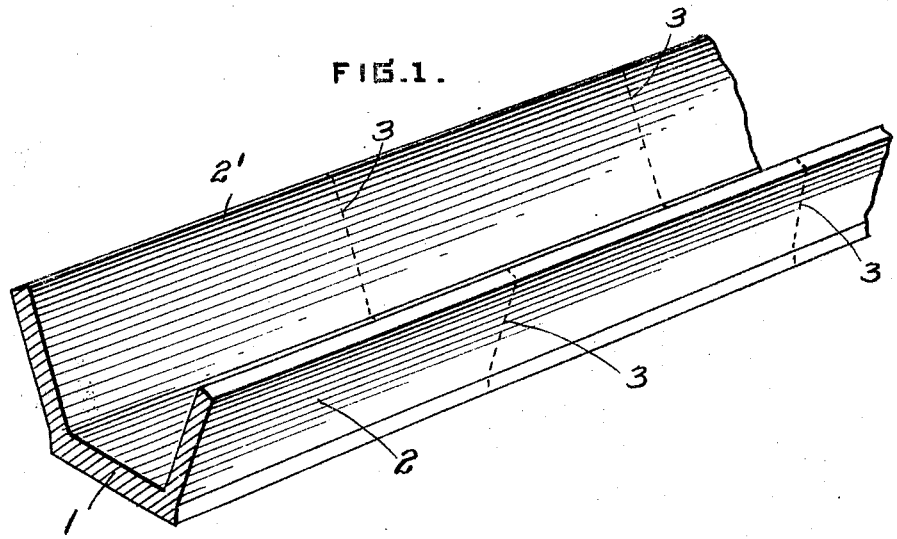
Figure 2:
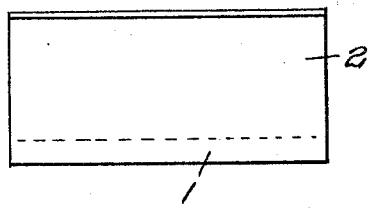
Figure 3:
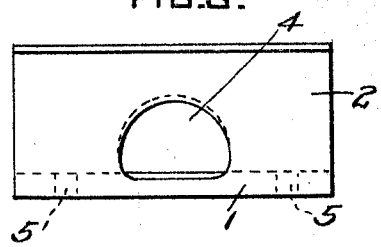
Figure 4:
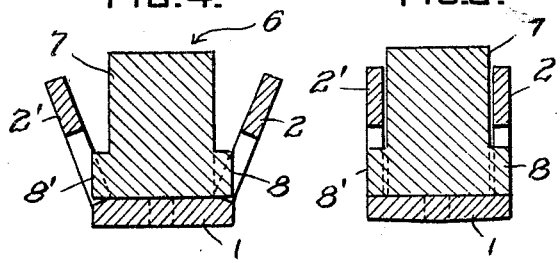
Figure 5:
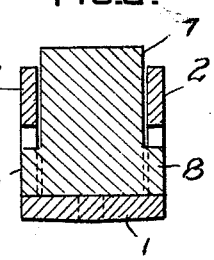
Figure 6:
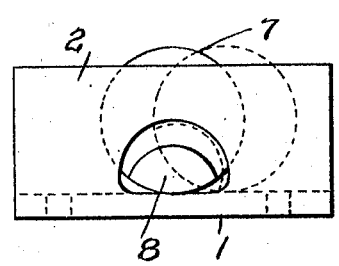

In the accompanying drawings, Fig. 1 is a fragmentary perspective view showing a portion of the rolled channel from which the cages are made; Fig. 2 an elevational view of one of the cage sections after it has been severed from the rolled channel shown in Fig. 1; Fig. 3 an elevational view of the cage after the several openings have been punched therein; Fig. 4 a transverse sectional view through the cage and roller after the roller has been positioned within the cage and prior to the bending of the side portions inwardly to lockingly engage the roller; Fig. 5 a view similar to Fig. 4 after the side walls have been bent inwardly towards each other to lockingly engage the roller; and Fig. 6 an elevational view illustrating the completed side bearing with the roller locked within the cage, together with a showing of the cooperation between the roller and the cage during its intended method of functioning.

In practicing the present method, an open ended channel beam or member, generally U-shaped in cross-section, such as illustrated in Fig. 1, is provided, the channel member being produced by a rolling or equivalent forging operation. Although the blanks for the cage may be formed separately, preferably a channel beam is rolled in comparatively long lengths (see Fig. 1) by any of the well known processes of producing such articles as by means of suitably grooved cooperating rolls. The beam or channel member comprises an intermediate base or floor portion 1 and the lateral side portions 2, 2', extending angularly with respect to the base or floor 1, the sides preferably extending at about the angle illustrated in Figs. 1 and 4 of the drawings.

The rolled beam or channel, if rolled in long lengths, is cut into appropriate sections by severing in any suitable manner, as by sawing, at the points 3—3 of Fig. 1. One of the severed sections is illustrated in Fig. 2, and consists of an open ended channel section corresponding in cross-section to the beam shown in Fig. 1.

After the beam has been sub-divided into sections corresponding to that shown in Fig. 2, the opposite side walls are punched so as to form the elongated openings 4, 4' adjacent the intermediate floor or base portion 1, and the floor portion may also be punched so as to provide the attaching apertures 5, 5'. the apertures 5, 5' receiving the means for anchoring the cage, such as rivets or bolts commonly used for this purpose.

A roller, such as indicated generally at 6, is then positioned within the cage section so as to rest upon the intermediate base or floor 1 and lie between the side walls 2, 2'. The body portion 7 of this roller is cylindrical in shape, having the axially extending retaining lugs 8, 8' positioned adjacent the periphery of the roller at a predetermined point thereof. The retaining lugs 8, 8' are preferably disposed at corresponding points of the roller and in alignment with each other, and may be shaped in the manner clearly shown in Fig. 6 of the drawings.

After the roller has been positioned as shown in Fig. 4, the opposite side walls 2, 2' are then bent inwardly towards each other from the positions shown in Fig. 4 to that shown in Fig. 5, so as to position the side walls in close proximity to the end walls of the cylindrical portion 7 of the roller, and lockingly embrace the retaining lugs 8, 8' by the aligned openings 4, 4', in the side walls. The openings 4, 4' are somewhat larger than the retaining lugs so that the latter are not only freely received within the openings, but permit rolling movement of the roller longitudinally of the cage from its normal centered position shown by the full lines in Fig. 6 of the drawings to the dotted lines showing in the said figure. An inspection of Fig. 6 will also clearly show that the retaining lugs and the openings 4, 4' not only prevent escapement of the roller from the cage, but cooperate therewith to limit longitudinal rolling movement of the roller within the cage because of the abutment of the lugs with the ends of the openings in the manner illustrated in the drawings. It will readily appear to those familiar with this art, that the location of the lugs upon the roller also serve as a means to render the roller self-centering, in that the lugs will tend to assume the position shown in full lines in Fig. 6 whenever the roller is released.

The principal object of applicant's invention is obviating the necessity of fabricating cages for side bearings by a casting operation, and providing an extremely simple method of producing these cages by simple forging steps. It is therefore noted that although the channel sections for the cages have been particularly defined as produced by a rolling operation, which is the one preferred, the making of the cage section by any equivalent forging operation is within the contemplated scope of the invention.

It is thus seen that the invention provides a method of forming roller side bearings for railway cars which eliminates the necessity of casting the cages, or employing other complicated and expensive forging operations in their production, comprises a method involving comparatively few steps, and produces a product which is simple in construction, effective in operation, and one which is an integral structure of comparatively light weight but of extreme strength.

I claim:

1. The method of forming roller side bearings, which comprises providing a rolled channel section having an intermediate portion and side portions disposed angularly thereto, punching openings in the side walls, positioning a roller having retaining projections extending axially therefrom between said side walls, and bending the side walls toward each other sufficiently to position the said projections within the openings in the side walls.

2. The method of forming roller side bearings which comprises providing a rolled channel section having an intermediate portion and side portions disposed angularly thereto, punching aligned openings in the opposite side walls, positioning a roller having retaining lugs extending axially therefrom between the said side walls, and bending the side walls toward each other sufficiently to embrace the said lugs by the said openings.

3. The method of forming roller side bearings which comprises providing a rolled channel section having an intermediate portion and side portions disposed angularly thereto, punching aligned elongated openings through the opposite side walls adjacent the said intermediate portion, positioning a roller having retaining and gravity centering lugs extending axially therefrom adjacent the periphery of the roller, and bending the side walls towards each other to lockingly engage the lugs by the said openings.

4. The method of forming roller side bearings which comprises providing a rolled channel section having a flat intermediate portion and flat marginal side portions disposed angularly thereto, punching aligned elongated openings through the opposite side portions adjacent the said intermediate portion, positioning a roller having lugs extending axially therefrom adjacent the periphery of the roller between the said side portions with said lugs in alignment with the punched openings, and bending the side walls along the line of juncture between the side walls and intermediate portion to lockingly engage the lugs by the said openings.

In testimony whereof, I sign my name.

ARTHUR B. SEVERN.